United States Patent
Han et al.

(10) Patent No.: US 11,030,470 B2
(45) Date of Patent: Jun. 8, 2021

(54) APPARATUS AND METHOD WITH LIVENESS VERIFICATION

(71) Applicant: Samsung Electronics Co., Ltd., Suwon-si (KR)

(72) Inventors: Jaejoon Han, Seoul (KR); Youngjun Kwak, Seoul (KR); Byungln Yoo, Seoul (KR); Changkyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 16/215,750

(22) Filed: Dec. 11, 2018

(65) Prior Publication Data

US 2019/0228248 A1 Jul. 25, 2019

(30) Foreign Application Priority Data

Jan. 22, 2018 (KR) .......................... 10-2018-0007814

(51) Int. Cl.
| | |
|---|---|
| *G06K 9/00* | (2006.01) |
| *G06K 9/62* | (2006.01) |
| *H04N 9/04* | (2006.01) |
| *H04N 5/33* | (2006.01) |
| *G06F 21/32* | (2013.01) |
| *G06N 3/08* | (2006.01) |
| *G06K 9/20* | (2006.01) |

(52) U.S. Cl.
CPC ......... *G06K 9/00906* (2013.01); *G06F 21/32* (2013.01); *G06K 9/00255* (2013.01); *G06K 9/00604* (2013.01); *G06K 9/2018* (2013.01); *G06K 9/6228* (2013.01); *G06K 9/6288* (2013.01); *G06N 3/08* (2013.01); *H04N 5/33* (2013.01); *H04N 9/04* (2013.01); *G06K 9/00221* (2013.01); *G06K 9/00597* (2013.01); *G06K 9/209* (2013.01)

(58) Field of Classification Search
CPC .................................................. G06K 9/00906
See application file for complete search history.

(56) References Cited

U.S. PATENT DOCUMENTS 7,536,037 B2    5/2009 Sung et al.
8,457,367 B1 *  6/2013 Sipe ................... G06K 9/00315
                                                  382/118
(Continued)

FOREIGN PATENT DOCUMENTS

CN    201242756 Y    5/2009
KR    2000-0036310 A 7/2000
(Continued)

OTHER PUBLICATIONS

Yi, D et al., "Face Anti-Spoofing: Multi-Spectral Approach", *Handbook of Biometric Anti-Spoofing*, 2014, p. 84-102 (20 pages in English).

(Continued)

*Primary Examiner* — Simon P Kanaan
(74) *Attorney, Agent, or Firm* — NSIP Law

(57) ABSTRACT

A processor-implemented liveness test method includes: obtaining a color image including an object and an infrared (IR) image including the object; performing a first liveness test using the color image; performing a second liveness test using the IR image; and determining a liveness of the object based on a result of the first liveness test and a result of the second liveness test.

27 Claims, 16 Drawing Sheets

(56) References Cited

U.S. PATENT DOCUMENTS

| | | | |
|---|---|---|---|
| 9,245,173 | B2 | 1/2016 | Lee et al. |
| 9,886,640 | B1* | 2/2018 | Chen .................... G06K 9/2018 |
| 2010/0102366 | A1 | 4/2010 | Lee et al. |
| 2014/0071293 | A1 | 3/2014 | Unnikrishnan |
| 2016/0019421 | A1 | 1/2016 | Feng et al. |
| 2016/0092731 | A1 | 3/2016 | Dainty et al. |
| 2018/0060680 | A1* | 3/2018 | Alon ....................... G06F 21/32 |
| 2019/0311472 | A1* | 10/2019 | Harrup ............... G06K 19/0614 |
| 2020/0082155 | A1* | 3/2020 | Kalscheur ............ G06K 9/2036 |

FOREIGN PATENT DOCUMENTS

| | | |
|---|---|---|
| KR | 10-1035669 B1 | 5/2011 |
| KR | 10-1123834 B1 | 3/2012 |
| KR | 10-1393717 B1 | 5/2014 |
| KR | 10-1415287 B1 | 7/2014 |

OTHER PUBLICATIONS

Menotti, D et al., "Deep Representations for Iris, Face, and Fingerprint Spoofing Detection", *IEEE Transactions on Information Forensics and Security*, vol. 10 No. 4, Apr. 2015, p. 864-879 (16 pages in English).

Partial European Search Report dated Jun. 26, 2019 in corresponding European Patent Application No. 19151612.9 (9 pages in English).

Extended European Search Report dated Oct. 28, 2020 in counterpart European Patent Appication No. 19151612.9 (6 pages in English).

* cited by examiner

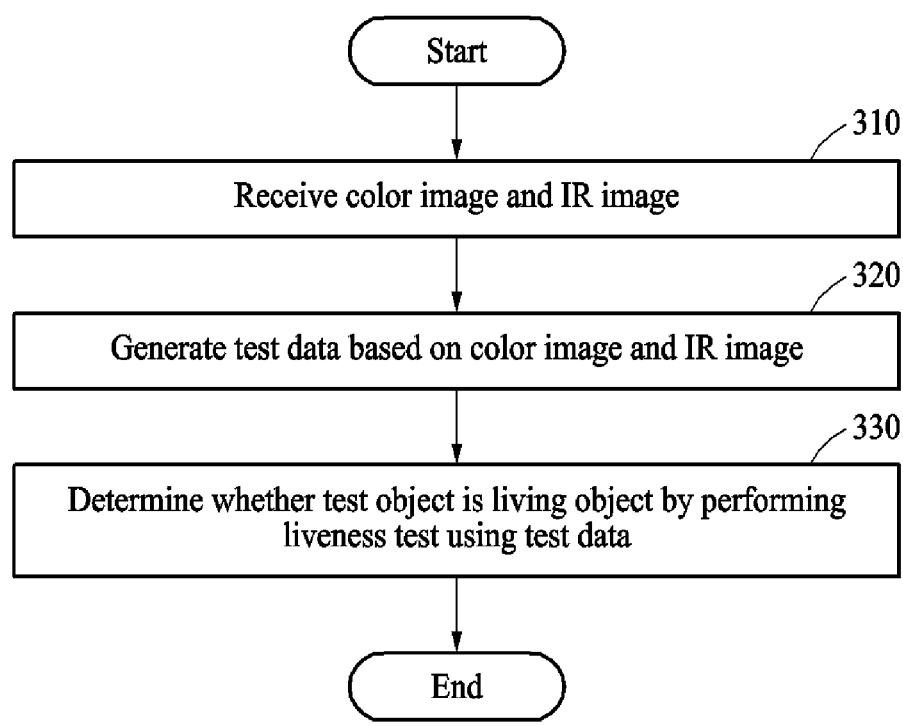

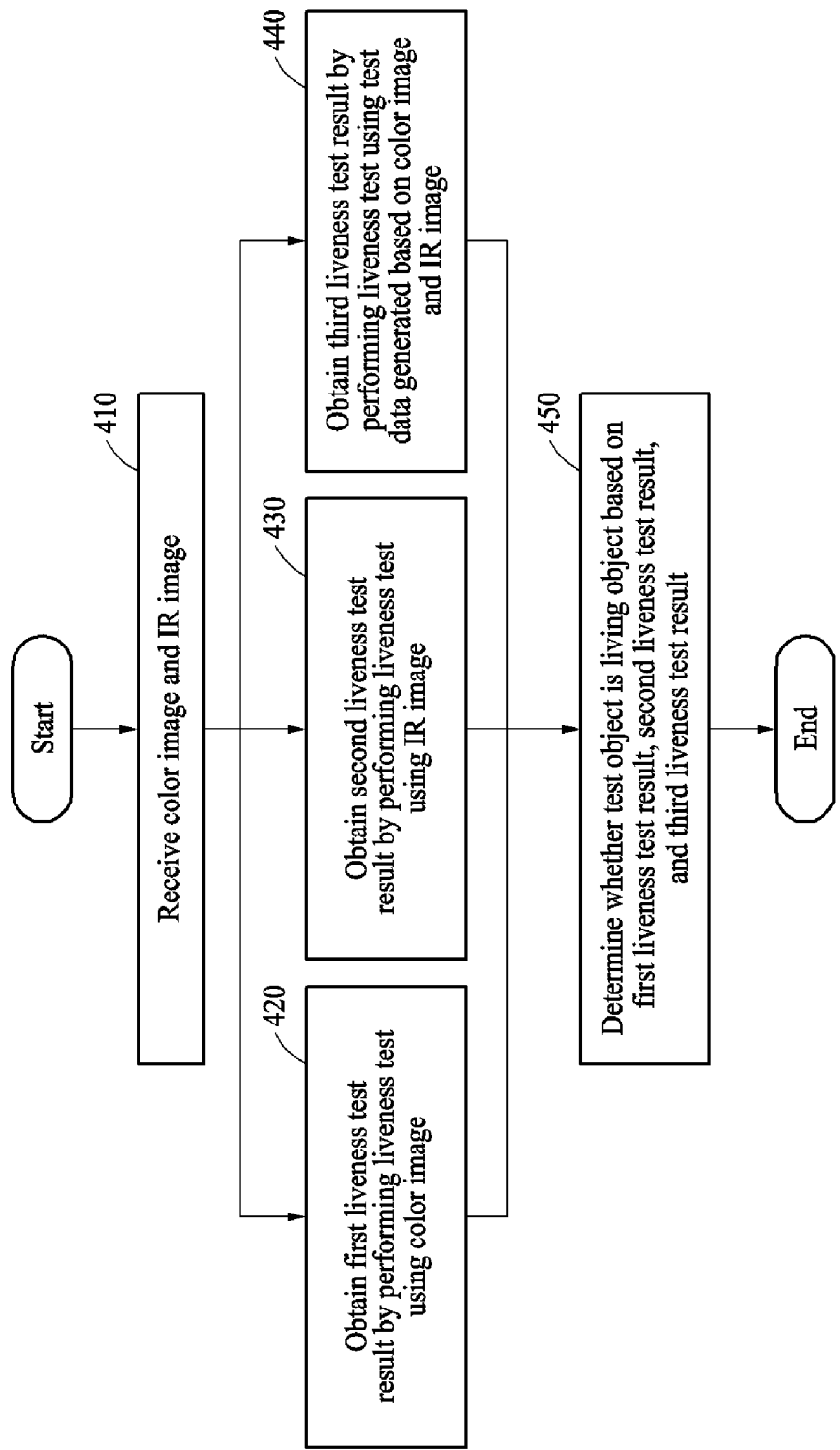

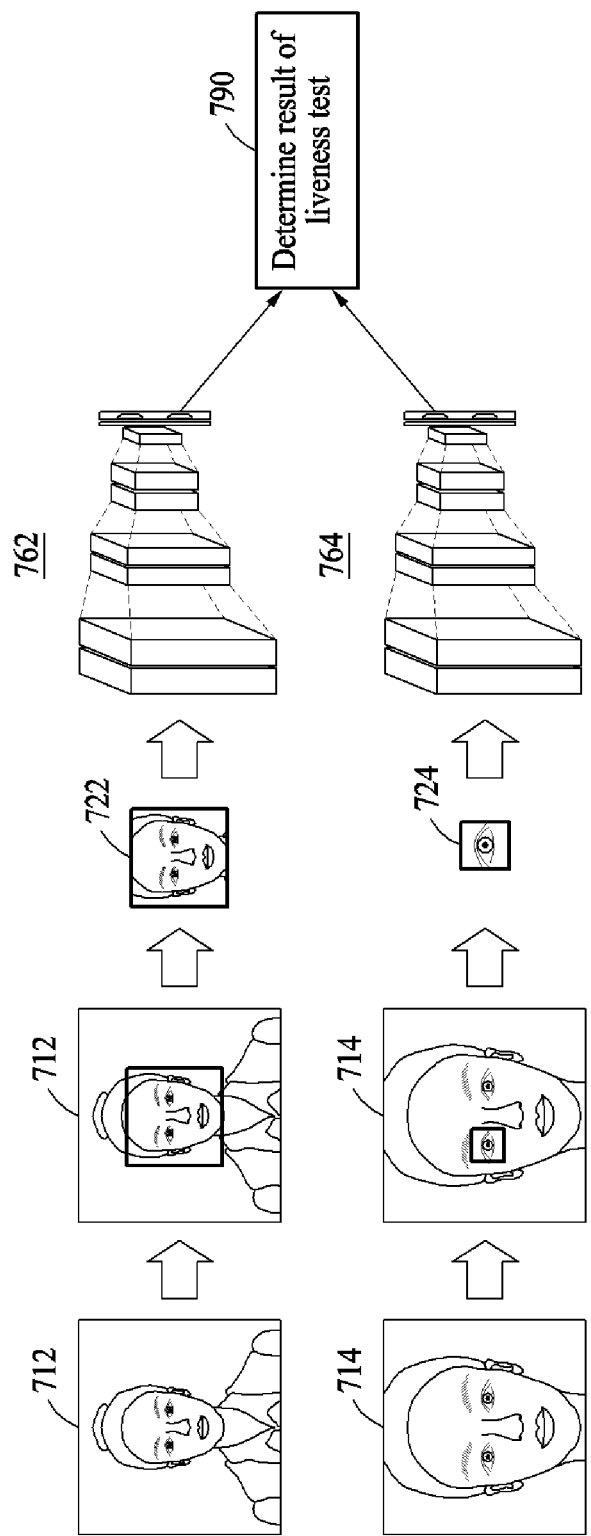

APPARATUS AND METHOD WITH LIVENESS VERIFICATION

CROSS-REFERENCE TO RELATED APPLICATIONS

This application claims the benefit under 35 USC § 119(a) of Korean Patent Application No. 10-2018-0007814 filed on Jan. 22, 2018, in the Korean Intellectual Property Office, the entire disclosure of which is incorporated herein by reference for all purposes.

BACKGROUND

1. Field

The following description relates to an apparatus and method with liveness detection and verification of an object in an image.

2. Description of Related Art

In a user verification system, a computing apparatus may determine whether to allow a user to have access to the computing apparatus based on verification information provided by the user. The verification information may include, for example, a password input by the user and biometric information of the user. The biometric information may include, for example, information associated with a fingerprint, an iris, and a face of the user.

Recently, face anti-spoofing approaches exist, where face spoofing may be a type of attack using, for example, an image, a video, or a mask that intends to spoof or trick an underlying device or system to believe that an authorized user or person is attempting access or use of the device. The face anti-spoofing technology may be used to determine whether a face of a user input to such a device or system is a fake face or a genuine face. The face anti-spoofing technology may include extracting features, such as, for example, a local binary pattern (LBP), a histogram of oriented gradients (HOG), and a difference of Gaussians (DoG), from an input image and making a determination of whether an input face is fake or genuine based on the extracted features.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented liveness test method including: obtaining a color image including an object and an infrared (IR) image including the object; performing a first liveness test using the color image; performing a second liveness test using the IR image; and determining a liveness of the object based on a result of the first liveness test and a result of the second liveness test.

The method may further comprise verifying whether the object corresponds to an authorized user; switching a device from a locked state to an unlocked state based on a result of the verification, wherein the obtaining of the color image and the IR image comprises obtaining the color image and the IR image using one or more image sensors of the device.

The verifying and the switching may be selectively performed depending on a result of the determining of the liveness of the object.

The performing of the first liveness test may be implemented using a neural network-based first liveness test model using the color image as an input.

The performing of the second liveness test may include using a neural network-based second liveness test model using the IR image as an input.

The determining of the liveness of the object may include determining that the object is living in response to the result of the first liveness test indicating that the object is living and the result of the second liveness test indicating that the object is living.

The determining of the liveness of the object may include determining whether the object is living based on a first score derived from the result of the first liveness test and a second score derived from the result of the second liveness test.

The determining of the liveness of the object may include determining that the object is living in response to a combination value, obtained based on the first score and the second score, being greater than a threshold.

The image sensor may include: one or more color light receivers configured to measure any one or any combination of any two or more of a red (R), a green (G), and a blue (B) color value of the color image; and one or more IR light receivers configured to measure an IR value of the IR image.

The color image and the IR image may include either one or both of a face region of the object and an iris region of the object.

The method may further include: detecting a first region of interest (ROI) of the object in the color image wherein the performing of the first liveness test comprises performing the first liveness test based on the detected first ROI; and detecting a second ROI of the object in the IR image wherein the performing of the second liveness test comprises performing the second liveness test based on the detected second ROI.

The first ROI and the second ROI may correspond to different regions of the object.

The performing of the first liveness test may include determining whether the color image has captured a IR representation of the object; and the performing of the second liveness test comprises determining whether the IR image has captured a color representation of the object.

The IR representation of the object may be a material IR image of the object, and the color representation of the object may be a material color image of the object.

The method may further include performing a third liveness test using based on the color image and the IR image, wherein the determination of the liveness of the object is based on a result of the third liveness test.

The method may further include generating a fused image by fusing the IR image and the color image, wherein the third liveness test is performed using the fused image.

In another general aspect, there is provided a processor-implemented liveness test method including: generating test data for a liveness test to be performed on an object based on a color image including the object and an infrared (IR) image including the object; and determining a liveness of the object based on a result of implementing a liveness test model using the test data as an input.

The generating of the test data may include generating the test data by combining the color image and the IR image.

The determining of the liveness of the object may include determining whether the object is living based on a result of comparing a score obtained from the liveness test model and a preset threshold.

In another general aspect, there is provided a processor-implemented liveness test method comprising: performing a first liveness test using a color image including a test object; performing a second liveness test using an infrared (IR) image including the object; performing a third liveness test using the color image and the IR image; and determining a liveness of the object based on a result of the first liveness test, a result of the second liveness test, and a result of the third liveness test.

The performing of the third liveness test may include: combining the color image and the IR image into a single image; and implementing a liveness test model using the single image.

The determining of the liveness of the object may include determining whether the object is living based on a first score derived from the result of the first liveness test, a second score derived from the result of the second liveness test, and a third score derived from the result of the third liveness test.

A non-transitory computer-readable storage medium may store instructions that, when executed by one or more processors, cause the one or more processors to perform the method.

In another general aspect, there is provided a liveness test apparatus comprising: one or more image sensors configured to obtain a color image including an object and an infrared (IR) image including the object; and one or more processors configured to: perform a first liveness test using the color image; perform a second liveness test using the IR image; and determine a liveness of the object based on a result of the first liveness test and a result of the second liveness test.

The one or more processors may be further configured to: perform the first liveness test using a neural network-based first liveness test model using the color image as an input; and perform the second liveness test using a neural network-based second liveness test model using the IR image as an input.

The one or more processors may be further configured to: perform a third liveness test based on a combination of the color image and the IR image; and determine the liveness of the object based on a result of the first liveness test, a result of the second liveness test, and a result of the third liveness test.

The one or more processors may be further configured to: detect a first region of interest (ROI) of the object in the color image; perform the first liveness test based on the detected first ROI; detect a second ROI of the object in the IR image; and perform the second liveness test based on the detected second ROI, wherein the first ROI and the second ROI correspond to different regions of the object.

The one or more image sensors may be further configured to measure a color value of the color image and an IR value of the IR image.

The one or more image may further comprise: one or more color light receivers configured to measure any one or any combination of any two or more of a red (R), a green (G), and a blue (B) color value of the color image; and one or more IR light receivers configured to measure the IR value.

The apparatus may further include memory storing instructions that, wherein when executed by the one or more processors, configure the one or more processors to perform the first and second liveness tests and the determination of the liveness.

In another general aspect, there is provided a liveness test apparatus comprising: one or more image sensors configured to obtain a color image including an object and an infrared (IR) image including the object; and one or more processors configured to: implement a liveness test modal using data generated based on the color image including the object and the IR image including the object; and determine a liveness of the object based on a result of the implementing of the liveness test model.

In another general aspect, there is provided a processor-implemented liveness test method comprising: performing a first liveness test using either one or both of an infrared (IR) image including a detected object and a color image including the detected object; generating a fused image by fusing the IR image and the color image; performing a second liveness test using the fused image; and determining a liveness of the object based on a result of the first liveness test and a result of the second liveness test.

Other features and aspects will be apparent from the following detailed description, the drawings, and the claims.

BRIEF DESCRIPTION OF THE DRAWINGS

FIG. 2A through 4 are flowcharts illustrating example liveness test methods.

Figure 1:
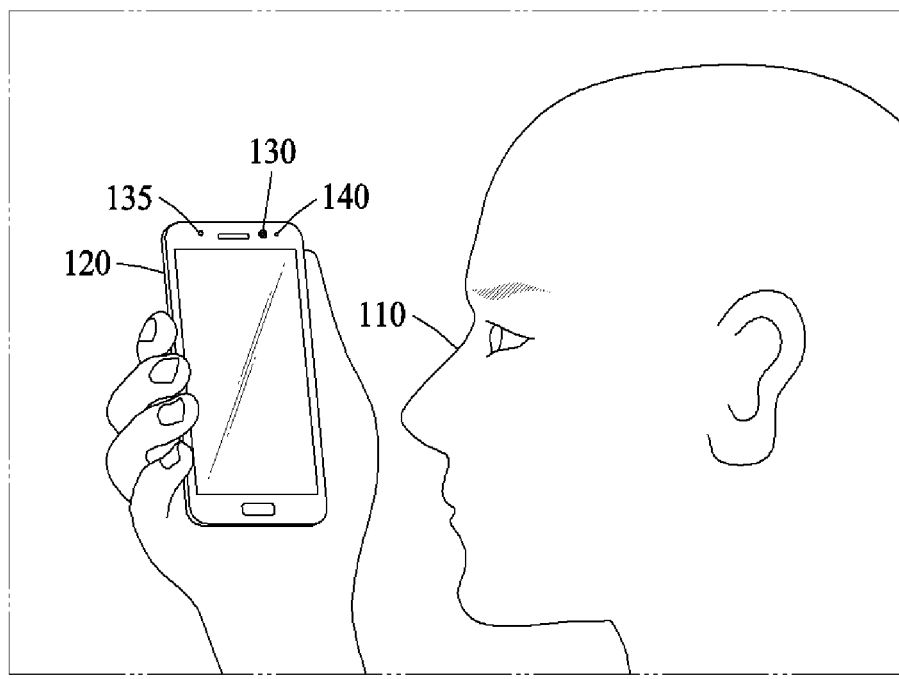
FIG. 1 is a diagram illustrating an example performance of a liveness test.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

FIG. 1 is a diagram illustrating an example of a liveness test.

A liveness test may be performed to determine whether a test object, which is a target for the liveness test, is live or not. As a non-limiting example, the liveness test may be performed to determine whether a face in an image captured by a camera is a genuine face or a fake face, or to determine whether the face in the image belongs to an alive person in the image or to an inanimate object in the image. In an example, the liveness test may be used to determine liveness of a verification object for user verification that is further performed for user log-in, payment services, access control, and the like in various examples. Herein, the verification object for user verification refers to a target to be under the user verification. As a non-limiting example, in a user verification system, such a liveness test may be performed to distinguish using captured image(s) between a lifeless object, as a non-limiting example, a photograph, an image, a paper, and a replica as a fake mechanism or form, and a living object, as a non-limiting example, a live human being, such as by distinguishing whether the object in the captured image is or is more likely a live object or the object is or is more likely a spoofed object, or by affirmatively determining that the object is or is not a live object, or is or is not a spoofed object. The liveness test may also be performed to prevent a false acceptance by filtering out, or blocking, an attempt for the verification, as a non-limiting example, a spoofing attack made using a substitute, as a non-limiting example, an image, a video, a mask, a contact lens, a replica, and the like. The use of the term 'may' herein with respect to an example or embodiment, e.g., as to what an example or embodiment may include or implement, means that at least one example or embodiment exists where such a feature is included or implemented while all examples and embodiments are not limited thereto.

An invalid user may use a spoofing technique in an attempt to obtain a false acceptance by a user verification system. As a non-limiting example, the invalid user may present, to a color camera of such a user verification system, a color image, a video, a replica, and the like in which a face of a valid user appears, to obtain a false acceptance in facial verification. For another example verification that may alternatively perform iris detection using infrared (IR) image, an invalid user may present, to an IR camera of such alternate user verification system, an IR image, a video, a replica, and the like in which an iris region of a valid user appears, to obtain a false acceptance in iris verification. Thus, a liveness test may also be performed to prevent such false acceptances by filtering out, or blocking, an attempt for the verification made based on such spoofing techniques.

The liveness test may be performed using an image, as a non-limiting example, a still image and a video, which is obtained by an image acquirer, as a non-limiting example, a camera. A liveness test to be described hereinafter may be performed using both a color image and an IR image, as a non-limiting example. A face region in a color image may be analyzed through typical facial verification in one approach, while an iris region in an IR image may be analyzed through typical iris verification in a distinctly different approach. Such typical approaches are distinct and only one respectively individually performed for a particular application, i.e., when facial verification is performed a color image analysis may be performed of a detected face region, while when iris verification is performed an IR image analyses may be performed of a detected iris region. However, compared to performing the liveness test based on only one of the color image and the IR image as in the above general approaches, dependent on the underlying facial or iris verification application, examples herein perform an example liveness test based on consideration of both a color image and an IR image of a an object. Such an example herein may improve accuracy of the liveness test over either of the aforementioned approaches individually. As a non-limiting example, such technological improvements may be achieved because, when performing an example liveness test, features in the color image and features in the IR image may complement one another or examples may rely on the complementary aspect of such features in the color image and the IR image.

Referring to FIG. 1, a liveness test apparatus configured to perform a liveness test on a test object may be included in, or represented by, a computing apparatus 120. The computing apparatus 120 may be, as a non-limiting example, a smartphone, a wearable device, a tablet computer, a netbook, a laptop computer, a desktop computer, a personal digital assistant (PDA), a set-top box, a home appliance, a biometric door lock, a security device, and a vehicle start device, as non-limiting examples. In an example, the liveness test apparatus may correspond to the liveness test apparatus 1000 of FIG. 10 and/or the computing apparatus 1100 of FIG. 11.

In the example illustrated in FIG. 1, a user 110 may attempt at user verification to have access to the computing apparatus 120 through facial verification or iris verification performed by the liveness test apparatus or the computing apparatus. As a non-limiting example, in a case in which the user 110 attempts at the facial verification to cancel a lock state of the computing apparatus 120, the computing apparatus 120 obtains a face image of the user 110 using a color camera 130, analyzes the obtained face image, and determines whether to cancel the lock state of the computing apparatus 120 based on a verification result of the analysis. For another example, in a case in which the user 110 attempts at the iris verification to cancel the lock state of the computing apparatus 120, the computing apparatus 120 activates an IR light source 135, analyzes an iris image of the user 110 obtained through an IR camera 140, and determines whether to cancel the lock state of the computing apparatus 120 based on a verification result of the analysis. In this example, when the user verification is successful, the computing apparatus 120 cancels the lock state and allows the user 110 to have access to the computing apparatus 120. Conversely, when the user verification is unsuccessful, the computing apparatus 120 continues to operate in the lock state.

In such a user verification example embodiment, a liveness test may be performed to determine whether a verification object for the user verification is a living object or a lifeless object by the liveness test apparatus before a result of the user verification is determined. Herein, in response to a determination that the verification object is a living object as a result of the liveness test, the computing apparatus 120 may then perform a determination of whether the user verification is successful or not. Conversely, in response to a determination that the verification object is a lifeless object, the computing apparatus 120 may continue to operate in the lock state without proceeding to such an operation of determining whether the user verification is successful or not.

In such a liveness test process, the liveness test apparatus may perform a liveness test on a test object using both a color image captured by the color camera 130 and an IR image captured by the IR camera 140, e.g., irrespective of a type of user verification. Using the color image and the IR image together may enable comprehensive consideration of color, reflection, and texture features of the test object for the liveness test. Herein, while the IR image may indicate an IR distribution feature instead of a color distribution feature, the color image may be used to determine a color feature of the test object and a texture feature indicated by reflection of visible light to perform the liveness test, for example. In addition, the IR image may also be used to determine a reflection feature of the test object and a texture feature indicated by reflection of IR light to perform the liveness test. The IR image obtained using the IR camera 140 may indicate a face skin feature, which is different from that indicated in the color image.

As a non-limiting example, when an invalid user presents a color image including a face (a fake face) to the computing apparatus 120 to induce a false acceptance in facial verification, an IR image obtained by capturing the color image by the IR camera 140 may be different from an IR image obtained by directly capturing a live test object by the IR camera 140. Thus, while the color camera 130 may capture the color image including the face for liveness verification, it is also advantageous for the IR camera 140 to capture the color image including the face for liveness verification, as an IR image capturing the color image including face is distinct from an IR image capturing the live test object. For another example, when the invalid user presets an IR image including an iris to the computing apparatus 120 to induce a false acceptance in iris verification, a color image obtained by capturing the IR image by the color camera 130 may be different from a color image obtained by directly capturing the live test object by the color camera 130. Thus, while the IR camera 140 may capture the IR image including the iris for liveness verification, it is also advantageous for the color camera 130 to capture the IR image including the iris for liveness verification, as a color image capturing the IR image including the iris is distinct from a color image capturing the live test object. Thus, the liveness test apparatus of the present disclosure which determines liveness of a test object using both a color image and an IR image that are obtained by capturing the same test object is more effective in filtering out or blocking an attempt for such a false acceptance based on the difference described in the foregoing than the typical liveness test apparatus which determines liveness of a test object based on either a color image or an IR image, but not both. The liveness test apparatus of the present disclosure which determines liveness of a test object using a color image obtained by the color camera 130 may help to more effectively determine whether an input test object is an actual human being or an IR image that is presented to induce a false acceptance compared to, e.g., a typical liveness test apparatus which determines liveness of a test object based on only an IR image. Also, using an IR image obtained by the IR camera 140 may help effectively determine whether an input test object is an actual human being or a color image that is presented to induce a false acceptance. As described, the liveness test apparatus of the present disclosure which determines liveness of a test object using both a color image and an IR image may improve accuracy of the liveness test compared to, e.g., the aforementioned typical liveness test apparatus which determines liveness of a test object based on either a color image or an IR image, but not both.

Thus, in an example, the liveness test apparatus may use a liveness test model for a liveness test. In an example, the liveness test model may be based on a neural network, or other machine learning examples, configured to output a value calculated by internal parameters based on input data. As a non-limiting example, the liveness test model may be a neural network-based liveness (or liveness and verification) model and configured so that, upon reading from a memory of its trained parameters by one or more processors, the one or more processors may implement the liveness test model for an input image to calculate, determine, or extract a liveness score specific to the trained objective, e.g., a liveness score of a color image, a liveness score of an infrared image, and/or a liveness score of a composite image. Using such a neural network-based liveness test model to obtain a result of the liveness test by collectively considering a color image and an IR image may improve performance and accuracy of the liveness test. The internal parameters of the liveness test model may be determined through training of the liveness test model. As a non-limiting example, in the training, there may be numerous sets of training data and desired values of the liveness test model respectively corresponding to the numerous sets of training data. When a certain set of training data is input to the liveness test model, the initial internal parameters of the liveness test model may be adjusted so that the liveness test model may output a desired value corresponding to the input training data. Such a training process may be performed for each set of training data, and thus the initial or interim internal parameters may be adjusted throughout the process such that the liveness test model may gradually output a more desired value. Therein, training may be performed through back-propagation or gradient-based training, noting that examples are not limited thereto. In the training process, the liveness test model may be trained to distinguish a difference between a color image obtained by a color camera and an IR image obtained by an IR camera in terms of a color feature, a reflection feature, a texture feature, and the like, e.g., until a predetermined accuracy and/or predetermined inaccuracy is met and the ultimately trained liveness test model is stored in the memory.

In an example, the liveness test model may be a model configured to perform a function of extracting a feature value from image data, as a non-limiting example, a pixel value, rather than being based all or partially on a neural network. As a non-limiting example, the liveness test model may extract a feature value that reflects therein a color feature, a reflection feature, a texture feature, and the like of the test object using an image feature extracting method that is known in the art to which the examples described herein pertain. In an example, such extraction may be performed by a neural network extractor, e.g., trained to extract such feature values, and liveness may then be separately determined based on the extracted feature values.

Hereinafter, how a liveness test apparatus performs a liveness test method on a test object using a color image and an IR image will be described in detail with reference to the accompanying drawings.

Figure 2A:
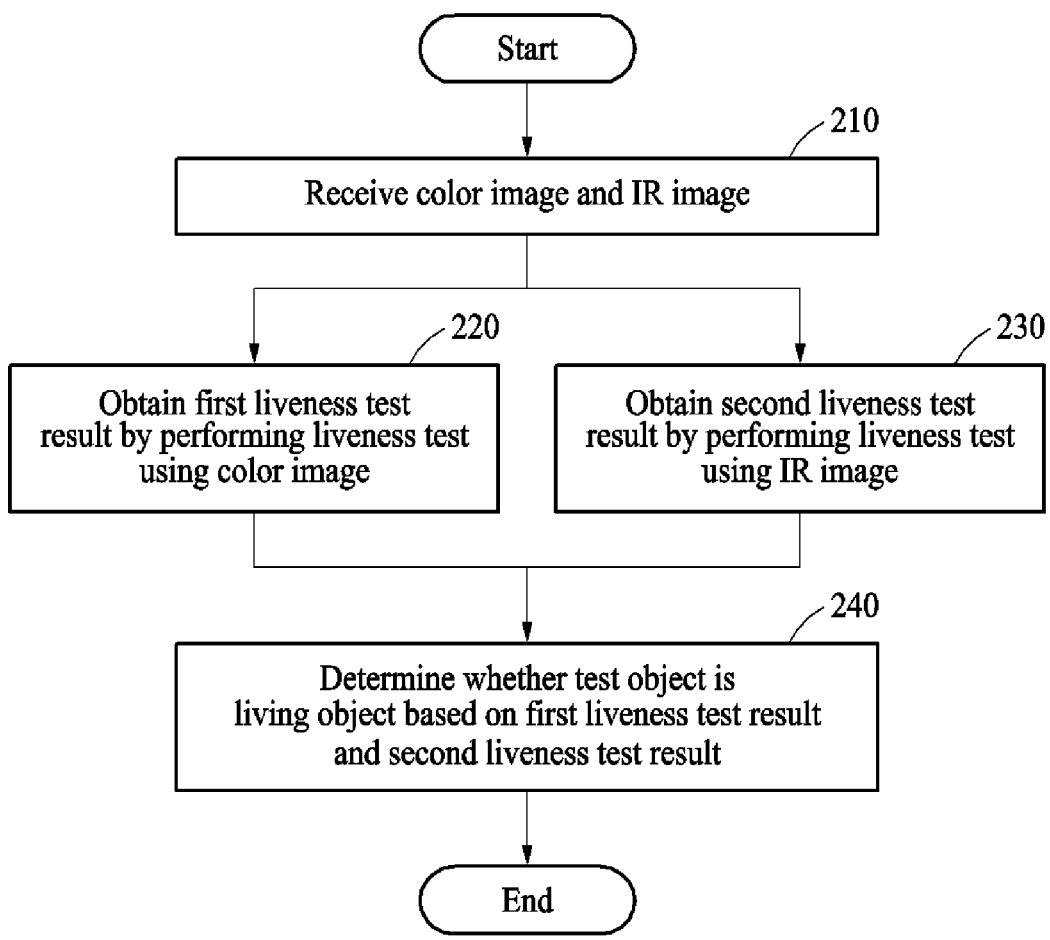

FIG. 2A is a flowchart illustrating an example of a liveness test method. The liveness test method to be described hereinafter with reference to FIG. 2A may be performed by a liveness test apparatus, such as the liveness test apparatus of FIG. 1, 9, or 10, noting that examples are not limited thereto.

Referring to FIG. 2A, in operation 210, the liveness test apparatus receives a color image and an IR image. The color image and the IR image may be obtained by a plurality of image sensors or cameras, e.g., of the liveness test apparatus, configured to independently sense or measure a color value and an IR value, or a single image sensor configured to measure both the color value and the IR value. The color image and the IR image may be captured simultaneously or captured at preset time intervals.

In an example, the color image and the IR image may be obtained by capturing an image of a same test object, as a non-limiting example, an object attempting at user verification, and include a region of interest (ROI) of the test object. According to an example, ROIs of same type, as a non-limiting example, face regions or iris regions, may be detected in the color image and the IR image, respectively, to perform a liveness test on the test object, or ROIs of different types or with different features may be detected in the color image and the IR image, respectively. As a non-limiting example, for the liveness test, an entire face region may be extracted from the color image, and a partial face region may be detected in the IR image. Alternatively, for the liveness test, a face region may be detected in the color image, and an iris region may be detected in the IR image. Hereinafter, the color image used for the liveness test may be an image corresponding to an ROI detected in the color image, and the IR image used for the liveness test may be an image corresponding to an ROI detected in the IR image.

Although not illustrated, according to an example, the liveness test apparatus may perform image preprocessing on at least one of the received color image or the received IR image. The image preprocessing may include at least one process to process the color image and/or the IR image to be more suitable for the liveness test. The image preprocessing may include, as a non-limiting example, adjusting a size of an image, rotating an image, removing noise included in an image, increasing a contrast of an image, deblurring an image, removing a background region from an image, warping to correct a distortion in an image, cropping an image, and binarizing an image.

In operation 220, the liveness test apparatus obtains a first liveness test result by performing a liveness test using the color image. In an example, the liveness test apparatus may obtain the first liveness test result for the color image using a first liveness test model. The first liveness test result may include information as to whether a liveness-related feature of the test object is indicated in the color image. The first liveness test model may provide information, as a non-limiting example, a probability value and a feature value, to be used to determine liveness of the test object based on information input to the first liveness test model.

In an example, the first liveness test model may be a neural network-based liveness test model using the color image as an input. As a non-limiting example, the first liveness test model may be a neural network-based liveness (or liveness and verification) model and configured so that, upon reading from a memory of its trained parameters by one or more processors, the one or more processors may implement the first liveness test model for an input image to calculate, determine, or extract a liveness score specific to the trained objective, e.g., a liveness score of a color image. As a non-limiting example, the first liveness test model may be based on a deep convolutional neural network (DCNN). The DCNN may include a convolution layer, a pooling layer, and a fully connected layer. Through an operation performed by each of the layers, the DCNN may provide information to be used to determine liveness based on image information input to the first liveness test model. Herein, the image information may be pixel values, as a non-limiting example, color values and/or brightness values, of pixels included in an image. The DCNN is provided herein merely as an example, and thus the first liveness test model may be based on a neural network of another structure other than the DCNN described in the foregoing.

Herein, parameters configuring the first liveness test model may be determined through training performed based on training data. In such a training process, there may be numerous sets of training data, and desired values respectively corresponding to the sets of training data. The first liveness test model may receive training data as an input, and output a resulting value corresponding to the training data through calculation or computation based on the parameters. Herein, a loss may be calculated based on a difference between the output resulting value and a desired value, and the first liveness test model may be trained by adjusting the parameters configuring the first liveness test model to reduce the loss. Such a training process may be performed repetitively for each of the sets of training data, and thus the parameters of the first liveness test model may be adjusted more desirably throughout the training process.

The first liveness test model may be based on a neural network as described above, but not be limited thereto. As a non-limiting example, the first liveness test model may be a model configured to output a feature value that reflects therein a color feature, a reflection feature, or a texture feature of the test object from the color image input to the first liveness test model through a known feature extracting method, rather than being based on the neural network.

The first liveness test result may be a result of determining liveness of the test object, as a non-limiting example, determining whether the test object is a living object, based on a first output value output from the first liveness test model. As a non-limiting example, the first liveness test result may be one of a resulting value indicating that the test object is a living object and a resulting value indicating that the test object is a lifeless object. For another example, the first liveness test result may be a first score based on the first output value output from the first liveness test model. As a non-limiting example, the first score may be equal to the first output value, or a value obtained through a predefined calculation including the first output value as an element.

In operation 230, the liveness test apparatus obtains a second liveness test result by performing a liveness test using the IR image. The liveness test apparatus may obtain the second liveness test result using a neural network-based second liveness test model using the IR image as an input. The second liveness test result may include information as to whether a feature related to liveness of the test object is indicated in the IR image.

Similarly to the first liveness test model, the second liveness test model may be a model configured to provide information, as a non-limiting example, a probability value and a feature value, to be used to determine liveness of the test object based on information input to the second liveness model. The second liveness test model may also be based on a DCNN, or a neural network of another structure different from the DCNN. As a non-limiting example, the second liveness test model may be a neural network-based liveness (or liveness and verification) model and configured so that, upon reading from a memory of its trained parameters by one or more processors, the one or more processors may implement the second liveness test model for an input image to calculate, determine, or extract a liveness score specific to the trained objective, e.g., a liveness score of an IR image Alternatively, the second liveness test model may be a model configured to output a feature value that reflects therein a color feature, a reflection feature, or a texture feature of the test object from the IR image input to the second liveness test model through a known feature extracting method, rather than being based on the neural network.

In an example, the second liveness test result may be a result of determining liveness of the test object, as a non-limiting example, determining whether the test object is a living object, based on a second output value output from the second liveness test model. As a non-limiting example, the second liveness test result may be one of a resulting value indicating that the test object is a living object and a resulting value indicating that the test object is a lifeless object.

For another example, the second liveness test result may be a second score based on the second output value output from the second liveness test model. As a non-limiting example, the second score may be equal to the second output value, or a value obtained through a predefined calculation including the second output value as an element.

In operation 240, the liveness test apparatus determines whether the test object is a living object based on the first liveness test result and the second liveness test result.

In an example, in a case of the first liveness test result and the second liveness test result being a resulting value indicating whether the test object is a living object or not, the liveness test apparatus may finally determine that the test object is a living object in response to a determination that the test object is a living object based on both the first liveness test result and the second liveness test result. Conversely, the liveness test apparatus may finally determine that the test object is a lifeless object in response to a determination that the test object is a lifeless object based on at least one of the first liveness test result or the second liveness test result.

In another example, in a case of the first liveness test result and the second liveness test result being the first score and the second score, respectively, the liveness test apparatus may determine that the test object is a living object in response to a combination value obtained based on the first score and the second score being greater than a threshold value. Conversely, the liveness test apparatus may determine that the test object is a lifeless object in response to the combination value not being greater than the threshold value. Herein, the combination value may be determined by, as a non-limiting example, a sum, a mean, and a weighted sum of the first score and the second score. However, examples are not limited to the example described in the foregoing, and thus the combination value may be determined through various methods.

The liveness test apparatus may perform a control operation in response to a result of the liveness test. In an example, in response to a final determination that the test object is a living object, the liveness test apparatus may generate a control signal to request execution of user verification. Conversely, in response to a final determination that the test object is not a living object, the liveness test apparatus may generate a control signal to block access of a user without requesting the execution of the user verification.

In the example illustrated in FIG. 2A, the color image and the IR image may be used for the liveness test, and ROIs of the color image to be used for the liveness test and ROIs of the IR image to be used for the liveness test may correspond to identical test regions or different test regions of the test object. As a non-limiting example, in a case in which test regions of the ROIs to be used for the liveness test are identical in the color image and the IR image, the liveness test apparatus may detect a face region or an iris region in both the color image and the IR image, and perform the liveness test based on the detected face region or the detected iris region. However, the test regions of the ROIs may be different from each other in the color image and the IR image, and such a case will be described in detail hereinafter with reference to FIG. 2B.

Figure 2B:
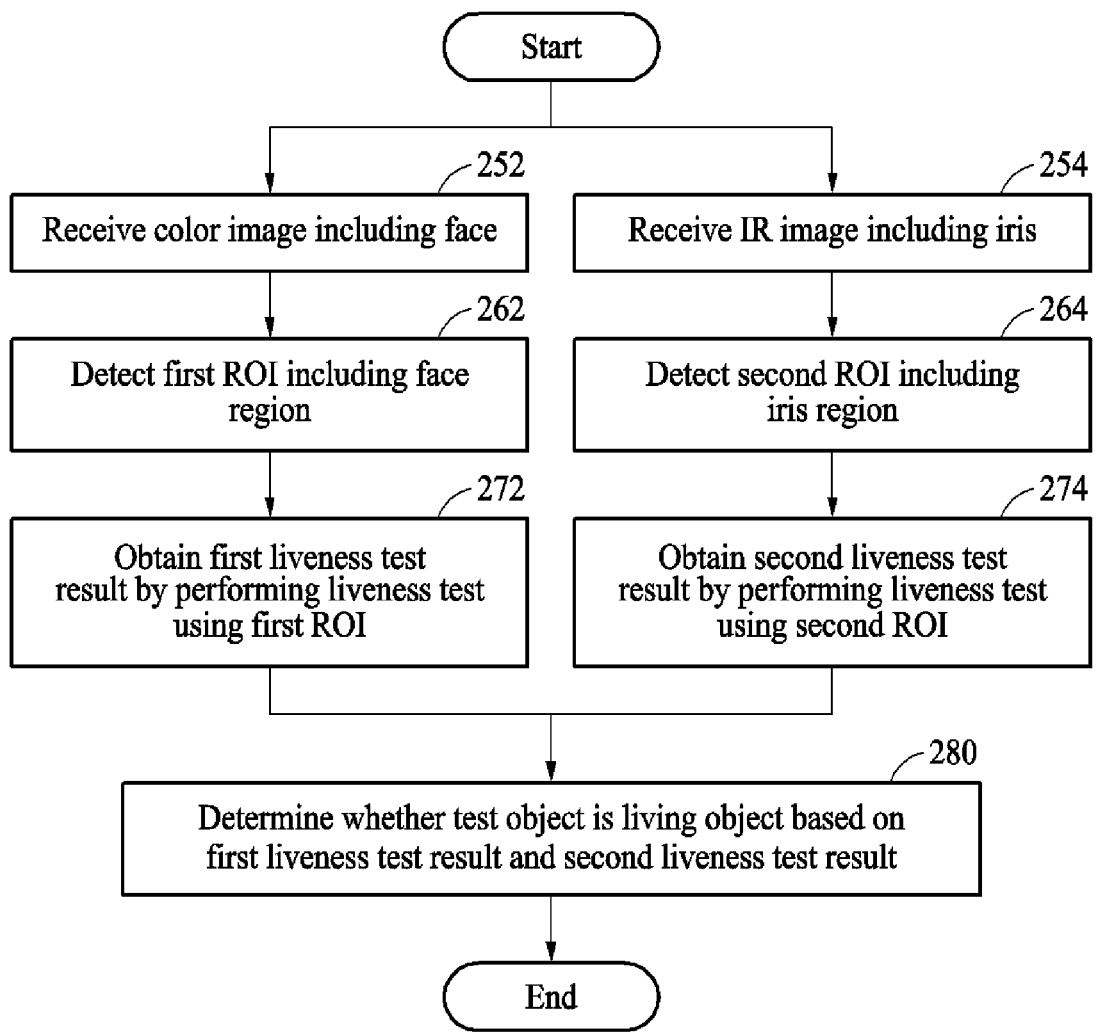

FIG. 2B is a flowchart illustrating another example of a liveness test method.

Referring to FIG. 2B, in operation 252, the liveness test apparatus receives a color image including a face. In operation 262, the liveness test apparatus detects a first ROI including a face region in the color image. Herein, as a non-limiting example, the liveness test apparatus may detect the first ROI in the color image using a haar-based cascade adaboost classifier. For another example, the liveness test apparatus may detect facial landmarks in the color image and determine the first ROI based on locations of the detected facial landmarks.

In operation 272, the liveness test apparatus obtains a first liveness test result by performing a liveness test based on the first ROI. Herein, the obtaining of the first liveness test result is the same as operation 220 of obtaining of the first liveness test result described above with reference to FIG. 2A, except that image data of the first ROI is input to a first liveness test model. Thus, a detailed and repeated description of operation 272 will be omitted here for brevity and clarity.

In operation 254, the liveness test apparatus receives an IR image including an iris. In operation 264, the liveness test apparatus detects a second ROI including an iris region in the IR image. The liveness test apparatus may detect facial landmarks in the IR image, and detect an eye region based on the detected facial landmarks. The liveness test apparatus may detect an iris region in the detected eye region, and set the second ROI including the iris region.

In operation 274, the liveness test apparatus obtains a second liveness test result by performing a liveness test based on the second ROI. Herein, the obtaining of the second liveness test result is the same as operation 230 of obtaining the second liveness test result described above with reference to FIG. 2B, except that image data of the second ROI is input to a second liveness test model. Thus, a detailed and repeated description of operation 274 will be omitted here for brevity and clarity.

In operation 280, the liveness test apparatus determines whether a test object is a living object based on the first liveness test result and the second liveness test result. For a detailed description of operation 280, reference may be made to operation 240 described above with reference to FIG. 2A.

In the example illustrated in FIG. 2B, the first ROI and the second ROI correspond to different test regions of the test object. As illustrated, the first ROI is the face region, and the second ROI is the iris region. However, examples are not limited to the example described in the foregoing, and types of ROI to be detected in the color image and the IR image are not limited to the illustrated example. As a non-limiting example, an iris region detected in the color image and a face region detected in the IR image may be used for the liveness test. For another example, an entire face region detected in the color image and a partial face region detected in the IR image may also be used for the liveness test.

FIG. 3 is a flowchart illustrating an example of a liveness test method.

Referring to FIG. 3, in operation 310, a liveness test apparatus receives a color image and an IR image. For a detailed description of operation 310, reference may be made to operation 210 described above with reference to FIG. 2A, as a non-limiting example.

In operation 320, the liveness test apparatus generates test data for a liveness test to be performed on a test object based on the color image and the IR image. In an example, the liveness test apparatus may generate the test data by combining the color image and the IR image. As a non-limiting example, the liveness test apparatus may generate the test data by concatenating the color image and the IR image. As another example, the liveness test apparatus may generate the test data by fusing the color image and the IR image.

In operation 330, the liveness test apparatus determines whether the test object is a living object by performing the liveness test using the test data generated in operation 320. The liveness test apparatus may determine whether the test object is a living object or not based on an output result of a liveness test model using the test data as an input. In an example, the liveness test model may correspond to a DCNN configured to use the test data as an input and output a resulting value corresponding to the input test data. The DCNN may output the resulting value corresponding to the test data based on internal parameters, and a score to be used to determine a result of the liveness test may be calculated based on the output resulting value. As a non-limiting example, the score may be equal to the resulting value output from the liveness test model, or a value obtained through a predefined calculation using the resulting value as an element. The liveness test apparatus may determine whether the test object is a living object based on a result of comparing the score and a preset threshold value. As a non-limiting example, in response to the score being greater than the threshold value, the liveness test apparatus may determine that the test object is a living object. Conversely, in response to the score not being greater than the threshold value, the liveness test apparatus may determine that the test object is a lifeless object. The liveness test model may be based on the DCNN as described above, but examples are not limited thereto. Thus, the liveness test model may be based on a neural network different from the DCNN. Alternatively, the liveness test model may be a model configured to extract a feature value that reflects therein a color feature, a reflection feature, or a texture feature of the test object using an image feature extracting method known to the art to which the examples of the present disclosure described herein pertain, rather than being based on the neural network.

FIG. 4 is a flowchart illustrating yet another example of a liveness test method. The liveness test method to be described hereinafter with reference to FIG. 4 is an example in which the example described with reference to FIG. 2A and the example described with reference to FIG. 3 are combined, as a non-limiting example.

Referring to FIG. 4, in operation 410, the liveness test apparatus receives a color image and an IR image. For a detailed description of operation 410, reference may be made to operation 210 described above with reference to FIG. 2A.

In operation 420, the liveness test apparatus obtains a first liveness test result by performing a liveness test using the color image. Herein, the obtaining of the first liveness test result is the same as operation 220 of obtaining of the first liveness test result described above with reference to FIG. 2A, and thus a more detailed and repeated description will be omitted here for brevity and clarity.

In operation 430, the liveness test apparatus obtains a second liveness test result by performing a liveness test using the IR image. Herein, the obtaining of the second liveness test result is the same as operation 230 of obtaining the second liveness test result described above with reference to FIG. 2A, and thus a more detailed and repeated description will be omitted here for brevity and clarity.

In operation 440, the liveness test apparatus obtains a third liveness test result by performing a liveness test using test data generated based on the color image and the IR image. For a detailed description of operation 440, reference may be made to operation 320 of generating the test data described above with reference to FIG. 3. As a non-limiting example, the liveness test apparatus may generate the test data by combining the color image and the IR image into a single image, and obtain the third liveness test result using a liveness test model using the generated test data as an input. For another example, each of the color image and the IR image may be input to the liveness test model, and the test data may be generated based on the color image and the IR image in a middle layer of the liveness test model, and then a score to be used to determine liveness of a test object may be output through the liveness test model.

In operation 450, the liveness test apparatus determines whether the test object is a living object based on the first liveness test result, the second liveness test result, and the third liveness test result. In an example, the liveness test apparatus may determine whether the test object is a living object based on a first score derived from the first liveness test result, a second score derived from the second liveness test result, and a third score derived from the third liveness test result. The liveness test apparatus may determine that the test object is a living object in response to a combination value obtained based on the first score, the second score, and the third score being greater than a threshold value, and determine that the test object is a lifeless object in response to the combination value being less than or equal to the threshold value. Herein, the combination value may be determined by, as a non-limiting example, a sum, a mean value, or a weighted sum of the first score, the second score, and the third score. However, examples are not limited to the example described in the foregoing, and the combination value may be determined through various methods.

In another example, the liveness test apparatus may determine whether the test object is a living object based on each of the first liveness test result, the second liveness test result, and the third liveness test result. In this example, when the test object is determined to be a living object based on at least two of the first liveness test result, the second liveness test result, and the third liveness test result, the liveness test apparatus may finally determine that the test object is a living object in response to the determination that the test object is a living object based on the at least two of the liveness test results. According to an example, in response to a determination that the test object is a living object based on at least one or all three of the liveness test results, the liveness test apparatus may finally determine that the test object is a living object.

Figure 5A:
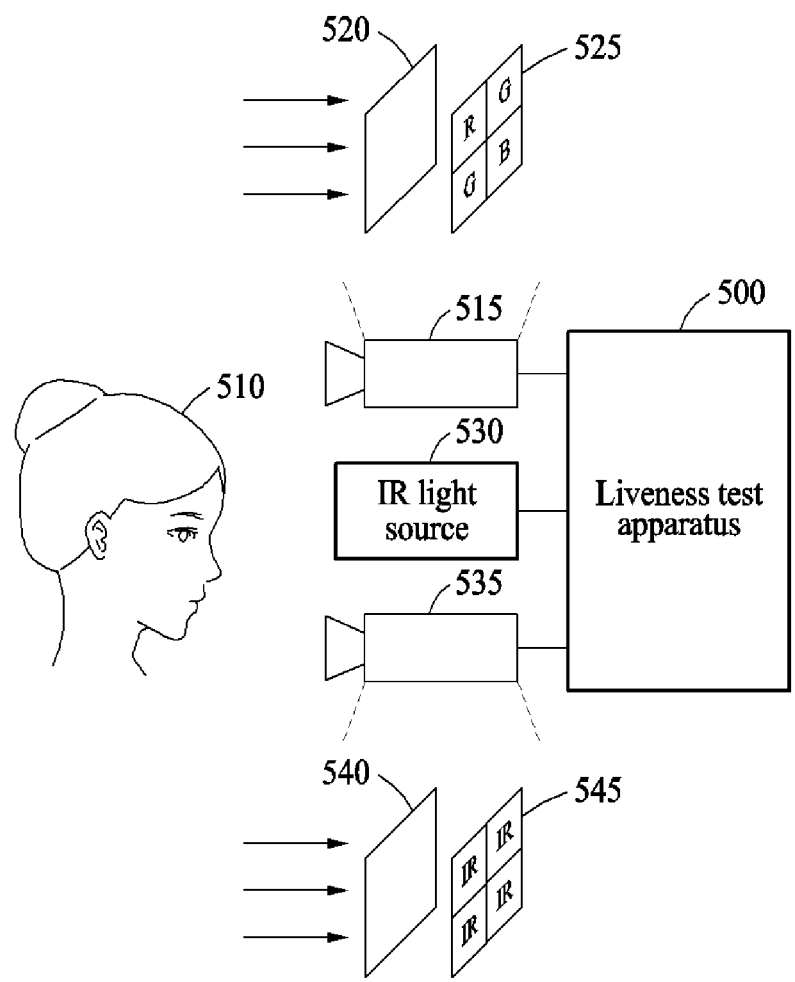
FIGS. 5A and 5B are diagrams illustrating examples of the use of a color image and an infrared (IR) image in an example liveness test.
Figure 5B:
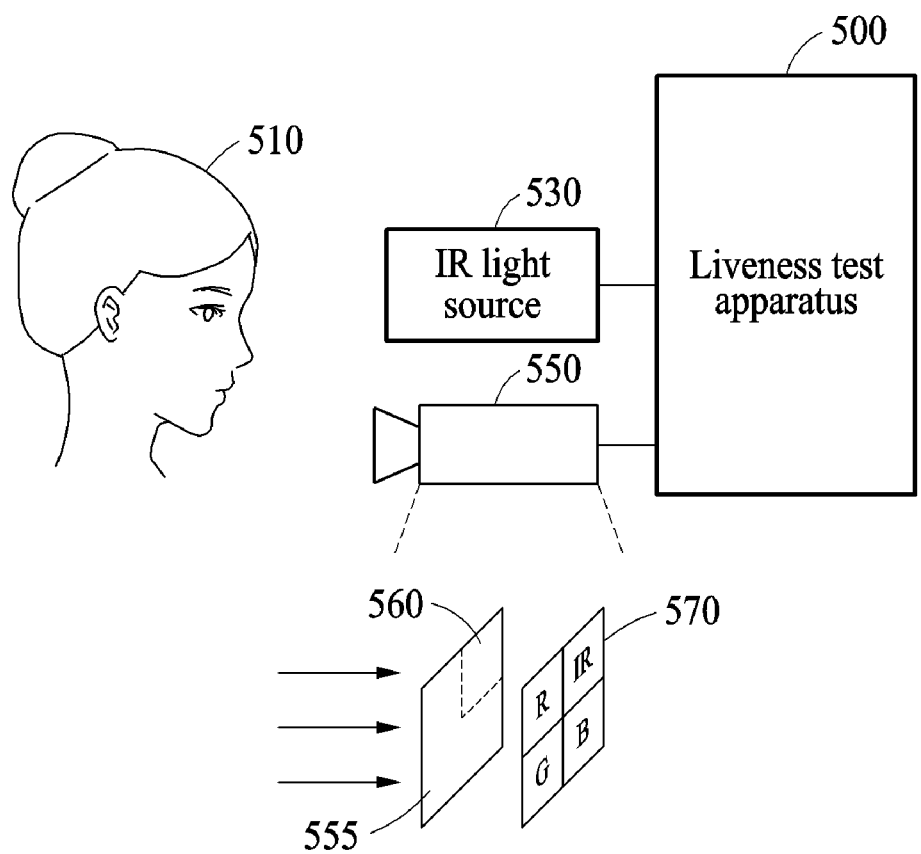

FIGS. 5A and 5B are diagrams illustrating examples of how a color image and an IR image to be used for a liveness test are obtained.

Referring to FIG. 5A, a color image and an IR image are obtained through respective image sensors 515 and 535. As a non-limiting example, in a case in which a user 510 desires to capture an image of a face or an iris for user verification, the color image may be obtained for the user verification through the color image sensor 515, and the IR image may be obtained for the user verification through the IR image sensor 535. The IR image may be obtained when IR light emitted from an IR light source 530 is reflected by the user 510 and then the reflected IR light is sensed by the IR image sensor 535. In an example, as illustrated, the color image sensor 515 includes an IR cut-off filter 520 to cut off the IR light from entering the color image sensor 515, and a color pixel array 525 to sense red, green, and blue (RGB) color values. The IR image sensor 535 includes an IR pass filter 540 to transmit the IR light incident on the IR image sensor 535, and an IR pixel array 545 to sense an IR value. In the example illustrated in FIG. 5A, a portion of an entire color pixel array is illustrated as the color pixel array 525, and a portion of an entire IR pixel array is illustrated as the IR pixel array 545.

When a liveness test is needed to be performed on the user 510, a liveness test apparatus 500 may receive a color image and an IR image from the color image sensor 515 and the IR image sensor 535, respectively, and perform the liveness test using the received color image and the received IR image.

Referring to FIG. 5B, a color image and an IR image are obtained through a single integrated image sensor 550. When a color image and an IR image of a test object are needed to perform a liveness test on the test object, a liveness test apparatus 500 activates an IR light source 530, and receives image information sensed by the integrated image sensor 550. In an example, as illustrated, the integrated image sensor 550 includes an optical filter including an IR cut-off region 555 that cuts off IR light incident on the integrated image sensor 550 and an IR pass region 560 that transmits the IR light, and a pixel array 570 configured to sense a color value and an IR value. In the example illustrated in FIG. 5B, only a portion of an entire pixel array is illustrated as the pixel array 570, and the integrated image sensor 550 may include a pixel array in which a pixel structure shown in the pixel array 570 is repeatedly arranged.

The integrated image sensor 550 measures both the color value and the IR value through the pixel array 570. The pixel array 570 includes a first light receiver to measure a red (R) color value, a second light receiver to measure a green (G) color value, a third light receiver to measure a blue (B) color value, and a fourth light receiver to measure the IR value. The liveness test apparatus 500 may separate the color value and the IR value measured by the integrated image sensor 550 from each other, and may generate the color image and the IR image based on a result of the separating. The liveness test apparatus 500 may then perform the liveness test based on the generated color image and the generated IR image.

Figure 6:
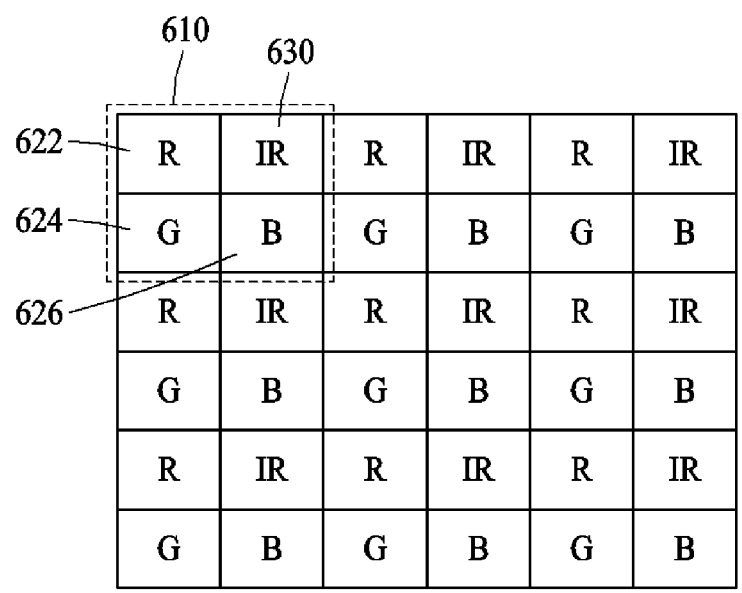
FIG. 6 is a diagram illustrating an example of a pixel array of an integrated image sensor in which a color sensor and an IR sensor are combined.

FIG. 6 is a diagram illustrating an example of a pixel array of an integrated image sensor in which a color sensor and an IR sensor are combined.

FIG. 6 illustrates a pixel array of an integrated image sensor configured to obtain both a color image and an IR image. The pixel array may correspond to the pixel array 570 illustrated in FIG. 5B. Referring to FIG. 6, the pixel array includes a plurality of pixel units 610, and each of the pixel units 610 includes color pixels 622, 624, and 626 to sense RGB color values and an IR pixel 630 to sense an IR value. The pixel array may be provided in a structure in which each of the pixel units 610 is repeatedly arranged. Each of the color pixels 622, 624, and 626 includes a light receiver to sense a color value corresponding to each of the color pixels 622, 624, and 626, and the IR pixel 630 includes a light receiver to sense the IR value. Arrangement of the color pixels 622, 624, and 626 and the IR pixel 630 of each pixel unit is not limited to the illustrated example, and various modifications or changes may be made to the example arrangement. Using such an integrated image sensor may reduce a difference between locations or capturing angles at which the color image and the IR image are obtained.

FIGS. 7A through 7D are diagrams illustrating examples of a liveness test method.

Figure 7A:
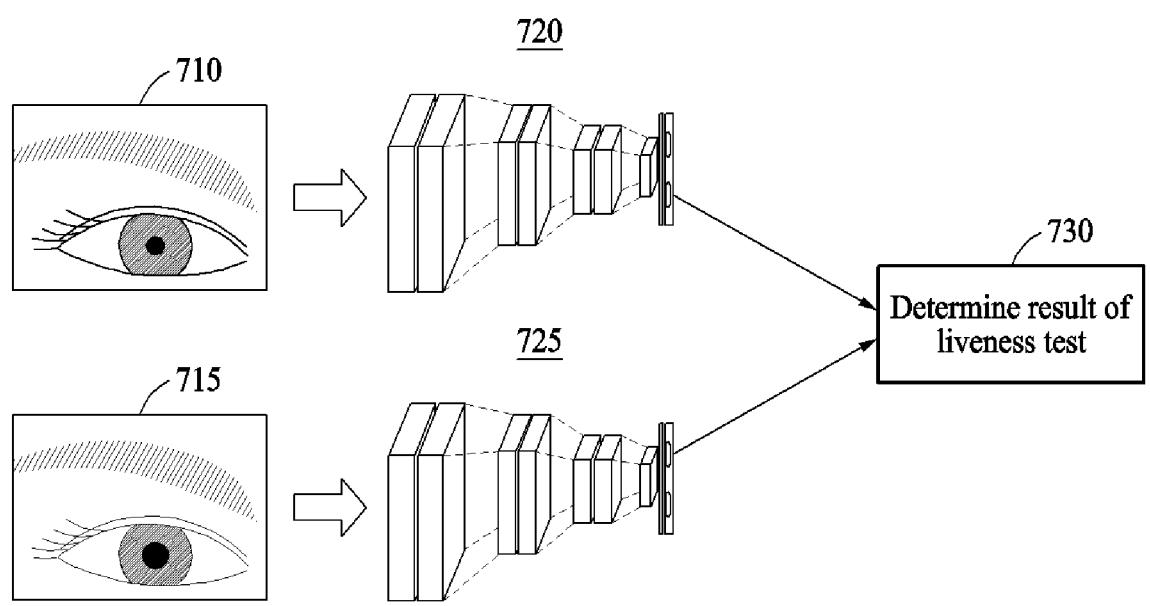
FIGS. 7A through 9 are diagrams illustrating example liveness test methods.

FIG. 7A illustrates an example of how a liveness test is performed during iris verification. Referring to FIG. 7A, for the liveness test, a color image 710 including an iris region is input to a first liveness test model 720, and an IR image 715 including the iris region is input to a second liveness test model 725. Herein, before the color image 710 and the IR image 715 are input to the first liveness test model 720 and the second liveness test model 725, respectively, various image preprocessing methods, such as, as a non-limiting example, image cropping, ROI extraction, and image resolution conversion, may be performed. The first liveness test model 720 outputs a first liveness test result corresponding to the color image 710. as a non-limiting example, the first liveness test model 720 may output a first score corresponding to the color image 710 through a calculation or computation operation determined by internal parameters of a neural network based on image data, as a non-limiting example, a color value and a brightness value, of the input color image 710. The second liveness test model 725 outputs a second liveness test result corresponding to the IR image 715. As a non-limiting example, the second liveness test model 725 may output a second score corresponding to the IR image 715 through a calculation or computation operation determined by internal parameters of a neural network based on image data, as a non-limiting example, an IR value, of the input IR image 720.

In operation 730, a liveness test apparatus determines a result of the liveness test based on the first score output from the first liveness test model 720 and the second score output from the second liveness test model 725. As a non-limiting example, in response to each of the first score and the second score being greater than a preset threshold value, or in response to a combination value obtained based on the first score and the second score being greater than a preset threshold value, the liveness test apparatus may determine that a test object for the liveness test is a living object. Examples of the determining of a result of the liveness test based on the first score and the second score are not limited to the example described in the foregoing, and thus a result of the liveness test may be determined through various methods.

Figure 7B:
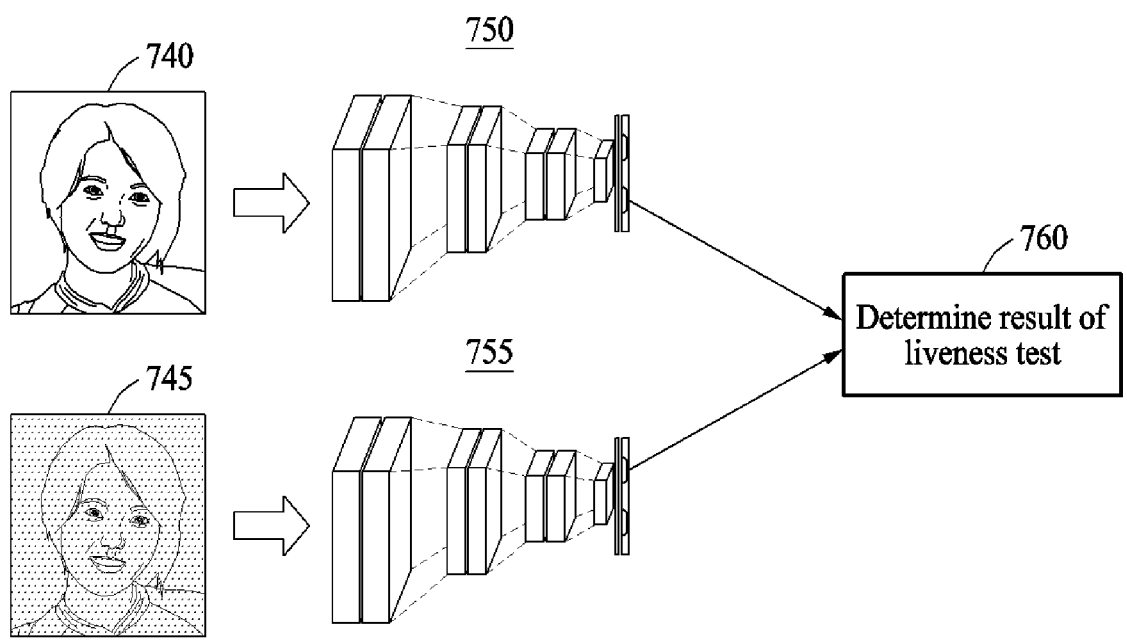

FIG. 7B illustrates an example of how a liveness test is performed during facial verification. Referring to FIG. 7B, for the liveness test, a color image 740 including a face region is input to a first liveness test model 750, and an IR image 745 including the face region is input to a second liveness test model 755. Similarly to the example illustrated in FIG. 7A, in operation 760, the liveness test apparatus determines a result of the liveness test based on a first score output from the first liveness test model 750 and a second score output from the second liveness test model 755.

Figure 7C:
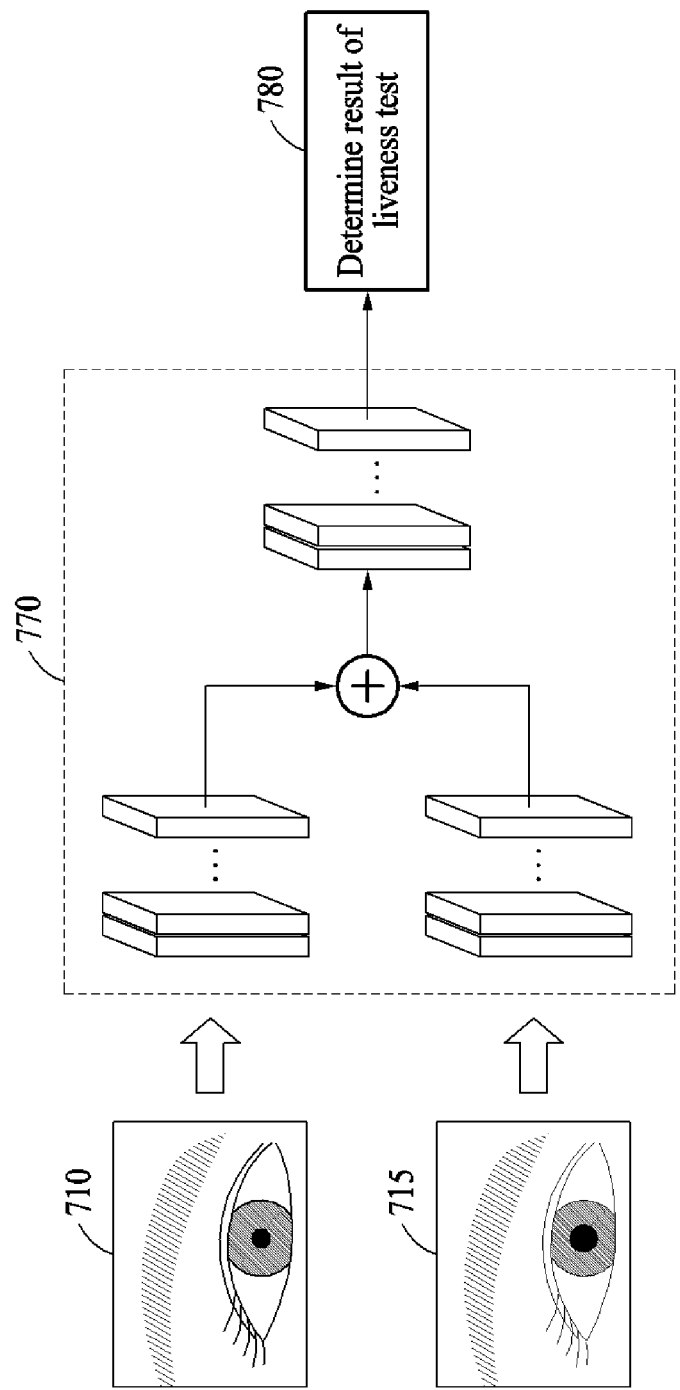

FIG. 7C illustrates an example of how a liveness test is performed using a single integrated test model. Referring to FIG. 7C, the first liveness model 720 and the second liveness test model 725 illustrated in FIG. 7A are replaced with a single integrated liveness test model 770. The color image 710 and the IR image 715 are individually input to the liveness test model 770, and the liveness test model 770 outputs a score through a calculation or computation operation performed based on internal parameters of the liveness test model 770. Herein, a feature of the color image 710 and a feature of the IR image 715 may be combined in a middle layer of the liveness test model 770, and the score may be calculated based on a result of the combining. In operation 780, the liveness test apparatus determines a result of the liveness test based on the score. As a non-limiting example, in response to the score satisfying a preset standard, the liveness test apparatus may determine that a test object is a living object.

FIG. 7D illustrates an example of how a liveness test is performed using different types of ROI in a color image and an IR image for the liveness test. Referring to FIG. 7D, a face region in a color image 712 and an iris region, or an eye region, in an IR image 714 are used.

For the liveness test, a first ROI 722 including the face region is detected in the color image 712, and the detected first ROI 722 is input to a first liveness test model 762. The first liveness test model 762 outputs a first liveness test result corresponding to the first ROI 722 through a calculation or computation operation performed based on internal parameters of the first liveness test model 762. In addition, for the liveness test, a second ROI 724 including the iris region or the eye region is detected in the IR image 714, and the detected second ROI 724 is input to a second liveness test model 764. The second liveness test model 764 outputs a second liveness test result corresponding to the second ROI 724 through a calculation or computation operation performed based on internal parameters of the second liveness test model 764. In operation 790, the liveness test apparatus determines a final result of the liveness test based on the first liveness test result and the second liveness test result.

Figure 8:
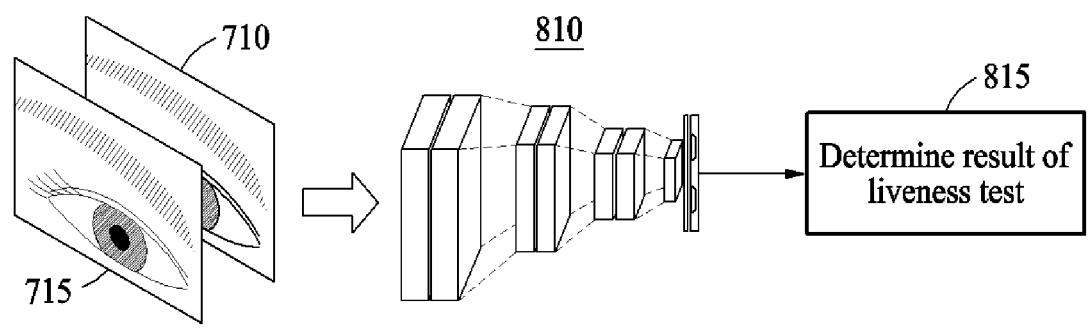

FIG. 8 is a diagram illustrating another example of a liveness test method.

Referring to FIG. 8, test data to be used for a liveness test to be performed on a test object is generated based on a color image 710 and an IR image 715. As a non-limiting example, the test data may be generated by combining, fusing, compositing, or concatenating, the color image 710 and the IR image 715 into a single set of data such as a combined, fused, composite, or concatenated image. As a non-limiting example, relevant information of the color image 710 and relevant information of the IR image 715 may be combined to create a single fused image of higher spatial resolution as compared to the spatial resolution of either of the color image 710 and the IR image 715, while preserving the spectral information the color image 710 and the IR image 715. The generated test data is input to a liveness test model 810, and the liveness test model 810 outputs a resulting value corresponding to the test data through a calculation or computation operation performed based on internal parameters of the liveness test model 810. In operation 815, a liveness test apparatus determines a result of the liveness test performed on the test object based on the resulting value. As a non-limiting example, in response to the resulting value or a score corresponding to the resulting value satisfying a preset standard, the liveness test apparatus may determine that the test object is a living object.

Figure 9:
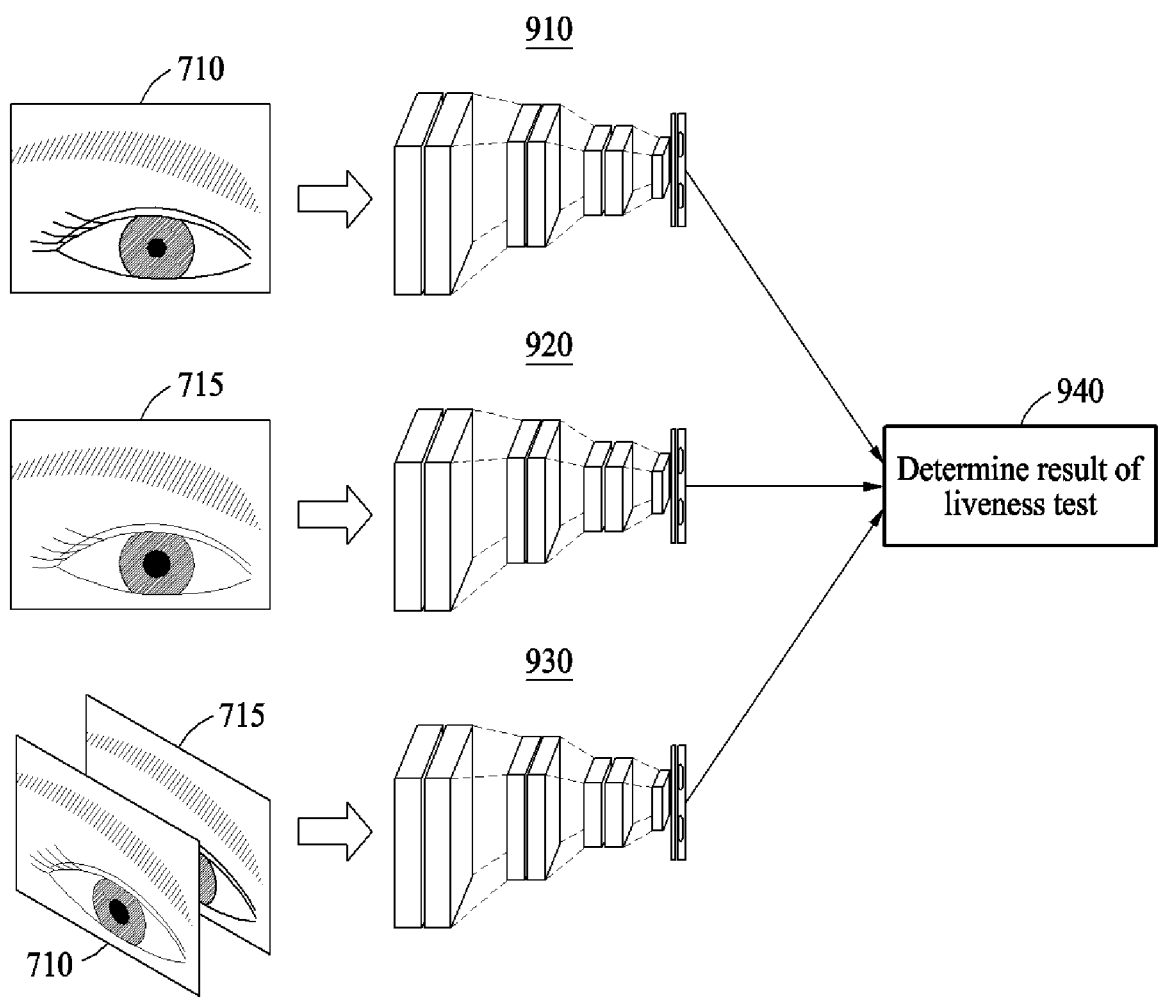

FIG. 9 is a diagram illustrating still another example of a liveness test method.

Referring to FIG. 9, similarly to the example illustrated in FIG. 7A, a color image 710 and an IR image 715 are input to a first liveness test model 910 and a second liveness test model 920, respectively, and the first liveness test model 910 and the second liveness test model 920 output a first liveness test result and a second liveness test result, respectively. In addition, similarly to the example illustrated in FIG. 8, test data to be used for a liveness test to be performed on a test object is generated based on the color image 710 and the IR image 715, and the generated test data is input to a third liveness test model 930 and then the third liveness test model 930 outputs a third liveness test result.

In operation 940, a liveness test apparatus determines a final result of the liveness test based on the first liveness test result, the second liveness test result, and the third liveness test result. In an example, when a final score determined based on a first score derived from the first liveness test result, a second score derived from the second liveness test result, and a third score derived from the third liveness test result is greater than a threshold value, the liveness test apparatus may determine that the test object is a living object. In this example, the final score may be determined through a predefined calculation or computation operation. However, the calculation operation is not limited to a certain example. As a non-limiting example, the final score may be determined by a sum or a weighted sum of scores. For another example, the final result of the liveness test may be determined for the test object based on whether at least two of the first score, the second score, and the third score satisfy a predefined standard.

In another example, the liveness test apparatus may determine the final result of the liveness test using only some of the three liveness test results. As a non-limiting example, in a case in which a type of user verification is facial verification, the liveness test apparatus may determine the final result of the liveness test using only the first liveness test result and the third liveness test result. For another example, in a case in which a type of user verification is iris verification, the liveness test apparatus may determine the final result of the liveness test using only the second liveness test result and the third liveness test result.

Figure 10:
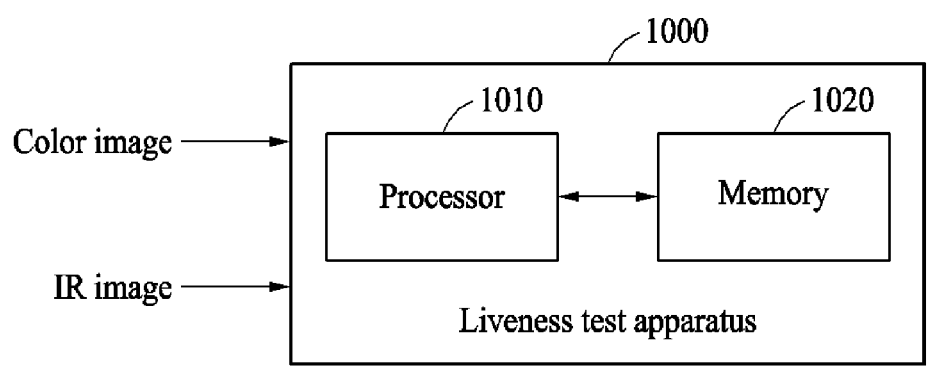
FIG. 10 is a diagram illustrating an example of a liveness test apparatus.

FIG. 10 is a diagram illustrating an example of a liveness test apparatus.

A liveness test apparatus 1000 may perform a liveness test using a color image and an IR image that are obtained by capturing a same test object for the liveness test, and provide a result of the liveness test. The liveness test apparatus 1000 may perform one or more or all operations or stages described herein in regard to the liveness test, such as also the performance of the verification operation, as well as further operations of the liveness test apparatus depending on a result of the liveness test and/or results of the verification operation.

Referring to FIG. 10, the liveness test apparatus 1000 includes a processor 1010 and a memory 1020. The memory 1020 may be connected to the processor 1010, and store instructions that may be executed by the processor 1010, data to be operated or calculated by the processor 1010, and/or data processed by the processor 1010. The memory 1020 may include a non-transitory computer-readable medium, as a non-limiting example, a high-speed random access memory (RAM) and/or a nonvolatile computer-readable storage medium (e.g., at least one disk storage device, flash memory device, and other nonvolatile solid-state memory devices).

The processor 1010 may perform one or more or all operations or stages described above with reference to FIGS. 1 through 9. As a non-limiting example, the processor 1010 may perform a liveness test on a test object based on a color image and an IR image that are obtained by an image sensor, and output a result of the liveness test.

In an example, as described with reference to FIGS. 2A and 2B, the processor 1010 may perform a liveness test using the color image to obtain a first liveness test result, and perform a liveness test using the IR image to obtain a second liveness test result. The processor 1010 may then determine whether the test object is a living object based on the obtained first liveness test result and the obtained second liveness test result. In this example, a neural network-based first liveness test model using the color image as an input may be used to obtain the first liveness test result, and a neural network-based second liveness test model using the IR image as an input may be used to obtain the second liveness test result.

In another example, as described with reference to FIG. 3, the processor 1010 may generate test data to perform the liveness test on the test object based on the color image and the IR image, and determine whether the test object is a living object based on an output result of a liveness test model using the generated test data as an input.

In still another example, as described with reference to FIG. 4, the processor 1010 may further obtain a third liveness test result by performing a liveness test based on test data in which the color image and the IR image are combined, in addition to the first liveness test result and the second liveness test result. The processor 1010 may then determine whether the test object is a living object based on the first liveness test result, the second liveness test result, and the third liveness test result.

In response to a determination that the test object is a living object, the liveness test apparatus 1000 may output notification data indicating that the liveness test is satisfied. Conversely, in response to a determination that the test object is a lifeless object, the liveness test apparatus 1000 may output notification data indicating that the liveness test is not satisfied.

Figure 11:
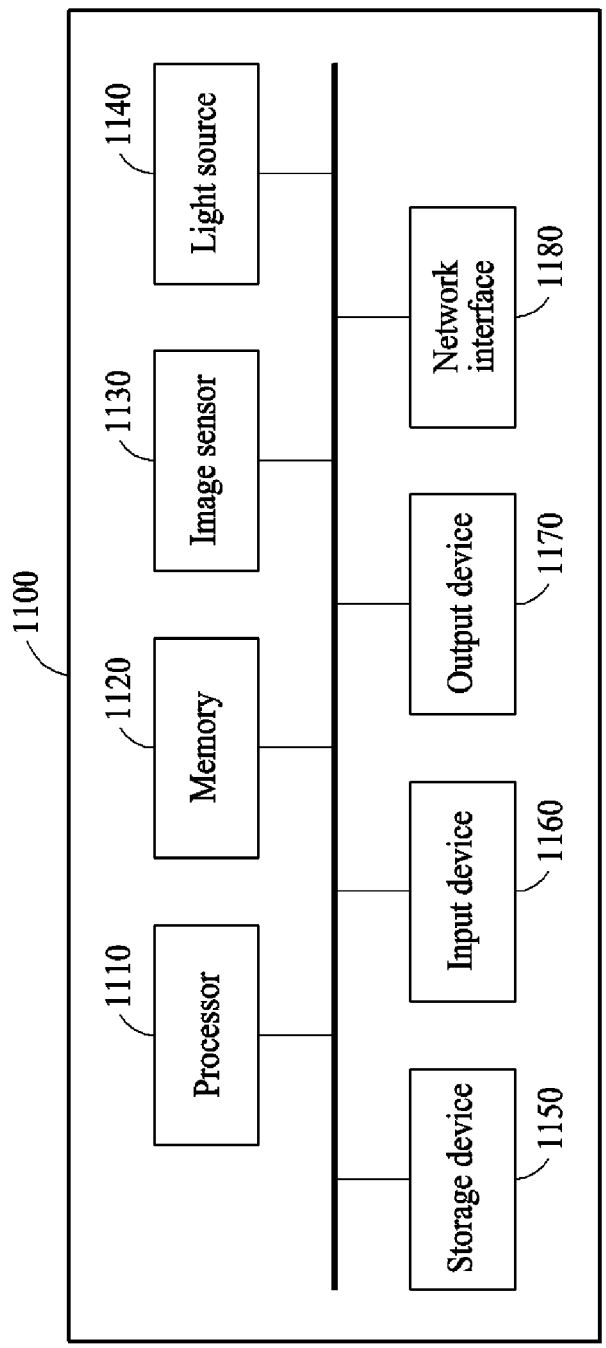
FIG. 11 is a diagram illustrating an example of a computing apparatus.

FIG. 11 is a diagram illustrating an example of a computing apparatus.

A computing apparatus 1100 may perform a liveness test on a test object included in an input image, and perform user verification. The computing apparatus 1100 may correspond to the computing apparatus 120 illustrated in FIG. 1, include the liveness test apparatus 1000 illustrated in FIG. 10, or be representative of such liveness test apparatus described herein.

Referring to FIG. 11, the computing apparatus 1100 includes a processor 1110, a memory 1120, an image sensor 1130, a light source 1140, a storage device 1150, an input device 1160, an output device 1170, and a network interface 1180. The processor 1110, the memory 1120, the image sensor 1130, the light source 1140, the storage device 1150, the input device 1160, the output device 1170, and the network interface 1180 may communicate with one another through a communication bus.

The processor 1110 may perform functions and execute instructions to perform a liveness test using a color image and an IR image, as well as the performance of the verification and control or non-control of the computing apparatus 1100 depending on results of the liveness test and/or liveness test and verification operation. As a non-limiting example, the processor 1110 may process instructions stored in the memory 1120 or the storage device 1150. The processor 1110 may perform one or more or all operations or stages described above with reference to FIGS. 1 through 10.

The memory 1120 may store information used to perform the liveness test. The memory 1120 may include a computer-readable storage medium or a computer-readable storage device. The memory 1120 may store instructions to be executed by the processor 1110 and information needed to perform the liveness test.

The image sensor 1130 may obtain the color image and the IR image that include a test object for the liveness test. In an example, the image sensor 1130 may include an image sensor to obtain the color image and an image sensor to obtain the IR image as illustrated in FIG. 5A. In another example, the image sensor 1130 may be an integrated image sensor to obtain both the color image and the IR image as illustrated in FIG. 5B. In this example, the image sensor 1130 may measure both a color value of the color image and an IR value of the IR image, and include a first light receiver to measure an R color value, a second light receiver to measure a G color value, a third light receiver to measure a B color value, and a fourth light receiver to measure the IR value.

The light source 1140 may emit IR light under the control of the processor 1110. The IR light emitted from the light source 1140 may be reflected by the test object, and the reflected IR light may be sensed by the image sensor 1130.

The storage device 1150 may include a computer-readable storage medium or a computer-readable storage device. The storage device 1150 may store a greater amount of information than the memory 1120, and store the information for a long period of time. The storage device 1150 may include, as a non-limiting example, a magnetic hard disk, an optical disk, a flash memory, and an electrically erasable programmable read-only memory (EPROM), a floppy disk, and other types of nonvolatile memory known in the art to which the examples described herein pertain.

The input device 1160 may receive an input from a user, as a non-limiting example, a tactile input, a video input, an audio input, and a touch input. The input device 1160 may detect the input from, as a non-limiting example, a keyboard, a mouse, a touchscreen, a microphone, and the user, and include other devices configured to transfer the detected input to the computing apparatus 1100.

The output device 1170 may provide the user with an output of the computing apparatus 1100 through a visual, audio, or tactile channel. The output device 1170 may include, as a non-limiting example, a display, a touchscreen, a speaker, a vibration generator, and other devices configured to provide the user with the output. The network interface 1180 may communicate with an external device through a wired or wireless network.

The computing apparatus 120, the color camera 130, the IR light source 135, the IR camera 140, the liveness test apparatus 500, the color image sensor 515, the IR cut-off filter 520, the color pixel array 525, the IR light source 530, the IR image sensor 535, the IR pass filter 540, the IR pixel array 545, the integrated image sensor 550, the IR cut-off region 555, the IR pass region 560, the pixel array 570, the pixel units 610, the color pixels 622, 624, and 626, the IR pixel 630, the first liveness test model 720, the second liveness test model 725, the first liveness test model 750, the second liveness test model 755, the liveness test model 770, the first liveness test model 762, the second liveness test model 764, the liveness test model 810, the first liveness test model 910, the second liveness test model 920, third liveness test model 930, liveness test apparatus 1000, the processor 1010, the memory 1020, the computing apparatus 1100, the processor 1110, the memory 1120, the image sensor 1130, the light source 1140, the storage device 1150, the input device 1160, the output device 1170, the network interface 1180, and other apparatuses, units, modules, devices, and other components described herein with respect to FIGS. 1 through 11 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 through 11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD- ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented liveness test method comprising:
   obtaining a color image including an object and an infrared (IR) image including the object;
   performing a first liveness test using the color image;
   performing a second liveness test using the IR image;
   generating a fused image by combining the IR image and the color image into a single set of data;
   performing a third liveness test by inputting the fused image into a neural network-based liveness test model; and
   determining a liveness of the object based on a result of the first liveness test, a result of the second liveness test, and a result of the third liveness test.

2. The method of claim 1, further comprising:
   verifying whether the object corresponds to an authorized user;
   switching a device from a locked state to an unlocked state based on a result of the verification,
   wherein the obtaining of the color image and the IR image comprises obtaining the color image and the IR image using one or more image sensors of the device.

3. The method of claim 2, wherein the verifying and the switching are selectively performed depending on a result of the determining of the liveness of the object.

4. The method of claim 1, wherein the performing of the first liveness test is implemented using a neural network-based first liveness test model using the color image as an input.

5. The method of claim 1, wherein the performing of the second liveness test comprises using a neural network-based second liveness test model using the IR image as an input.

6. The method of claim 1, wherein the determining of the liveness of the object comprises determining that the object is living in response to the result of the first liveness test indicating that the object is living and the result of the second liveness test indicating that the object is living.

7. The method of claim 1, wherein the determining of the liveness of the object comprises determining whether the object is living based on a first score derived from the result of the first liveness test and a second score derived from the result of the second liveness test.

8. The method of claim 7, wherein the determining of the liveness of the object comprises determining that the object is living in response to a combination value, obtained based on the first score and the second score, being greater than a threshold.

9. The method of claim 2, wherein the image sensor comprises:
   one or more color light receivers configured to measure any one or any combination of any two or more of a red (R), a green (G), and a blue (B) color value of the color image; and
   one or more IR light receivers configured to measure an IR value of the IR image.

10. The method of claim 1, wherein the color image and the IR image comprise either one or both of a face region of the object and an iris region of the object.

11. The method of claim 1, further comprising:
    detecting a first region of interest (ROI) of the object in the color image wherein the performing of the first liveness test comprises performing the first liveness test based on the detected first ROI; and
    detecting a second ROI of the object in the IR image wherein the performing of the second liveness test comprises performing the second liveness test based on the detected second ROI.

12. The method of claim 11, wherein the first ROI and the second ROI correspond to different regions of the object.

13. The method of claim 1, wherein:
    the performing of the first liveness test comprises determining whether the color image has captured a IR representation of the object; and
    the performing of the second liveness test comprises determining whether the IR image has captured a color representation of the object.

14. The method of claim 13, wherein the IR representation of the object is a material IR image of the object, and the color representation of the object is a material color image of the object.

15. A processor-implemented liveness test method comprising:
    generating test data for a liveness test to be performed on an object by combining a color image including the object and an infrared (IR) image including the object into a single set of data; and
    determining a liveness of the object based on a result of implementing a neural network-based liveness test model using the test data as an input.

16. The method of claim 15, wherein the determining of the liveness of the object comprises determining whether the object is living based on a result of comparing a score obtained from the liveness test model and a preset threshold.

17. A processor-implemented liveness test method comprising:

performing a first liveness test using a color image including a test object;

performing a second liveness test using an infrared (IR) image including the object;

combining the color image and the IR image into a single image;

performing a third liveness test by inputting the single image into a neural network-based liveness test model; and determining a liveness of the object based on a result of the first liveness test, a result of the second liveness test, and a result of the third liveness test.

18. The method of claim 17, wherein the determining of the liveness of the object comprises determining whether the object is living based on a first score derived from the result of the first liveness test, a second score derived from the result of the second liveness test, and a third score derived from the result of the third liveness test.

19. A non-transitory computer-readable storage medium storing instructions that, when executed by one or more processors, cause the one or more processors to perform the method of claim 1.

20. A liveness test apparatus comprising:

one or more image sensors configured to obtain a color image including an object and an infrared (IR) image including the object; and one or more processors configured to:
perform a first liveness test using the color image;
perform a second liveness test using the IR image;
perform a third liveness test by inputting a combination of the color image and the IR image into a neural network-based liveness test model; and
determine a liveness of the object based on a result of the first liveness test, a result of the second liveness test, and a result of the third liveness test.

21. The apparatus of claim 20, wherein the one or more processors are further configured to:
perform the first liveness test using a neural network-based first liveness test model using the color image as an input; and
perform the second liveness test using a neural network-based second liveness test model using the IR image as an input.

22. The apparatus of claim 20, wherein the one or more processors are further configured to:
detect a first region of interest (ROI) of the object in the color image;
perform the first liveness test based on the detected first ROI;
detect a second ROI of the object in the IR image; and
perform the second liveness test based on the detected second ROI,
wherein the first ROI and the second ROI correspond to different regions of the object.

23. The apparatus of claim 20, wherein the one or more image sensors are configured to measure a color value of the color image and an IR value of the IR image.

24. The apparatus of claim 23, wherein the one or more image sensors comprise:
one or more color light receivers configured to measure any one or any combination of any two or more of a red (R), a green (G), and a blue (B) color value of the color image; and
one or more IR light receivers configured to measure the IR value.

25. The apparatus of claim 20, further comprising memory storing instructions that, wherein when executed by the one or more processors, configure the one or more processors to perform the first and second liveness tests and the determination of the liveness.

26. A liveness test apparatus comprising:
one or more image sensors configured to obtain a color image including an object and an infrared (IR) image including the object; and
one or more processors configured to:
implement a neural network-based liveness test model using data generated by combining the color image including the object and the IR image including the object into a single set of data; and
determine a liveness of the object based on a result of the implementing of the liveness test model.

27. A processor-implemented liveness test method comprising:
performing a first liveness test using either one or both of an infrared (IR) image including a detected object and a color image including the detected object;
generating a fused image by combining the IR image and the color image into a single set of data;
performing a second liveness test by inputting the fused image into a neural network-based liveness test model; and
determining a liveness of the object based on a result of the first liveness test and a result of the second liveness test.

* * * * *